March 12, 1935.   C. H. KAVANAGH   1,994,362
FRUIT PICKER'S BAG
Filed Feb. 9, 1932
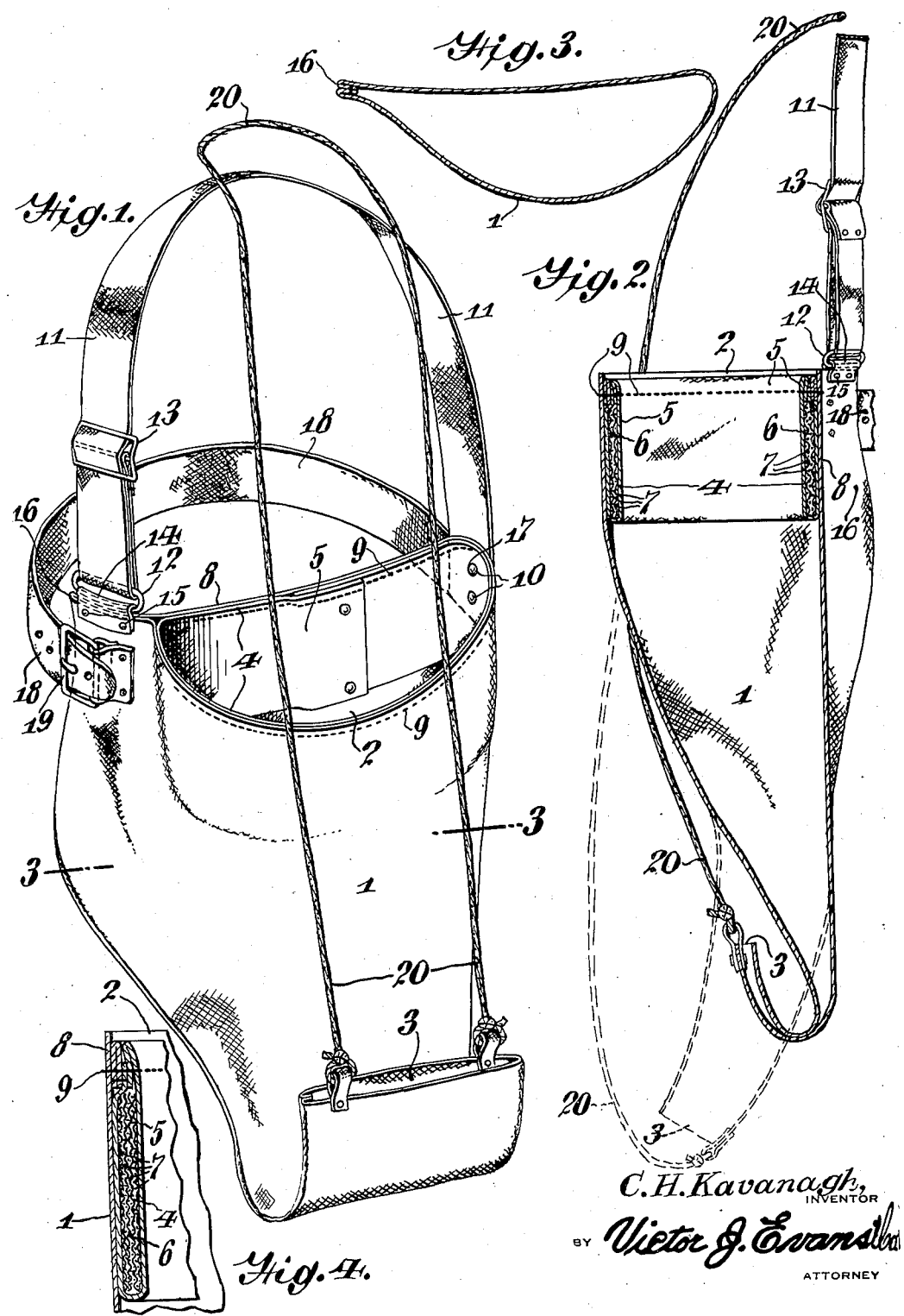
C. H. Kavanagh, INVENTOR
BY Victor J. Evans, ATTORNEY Patented Mar. 12, 1935

1,994,362

UNITED STATES PATENT OFFICE 1,994,362

FRUIT PICKER'S BAG

Charles H. Kavanagh, Glassboro, N. J.

Application February 9, 1932, Serial No. 591,867

2 Claims. (Cl. 150—2)

This invention relates to an improved bag adapted for use by fruit pickers.

Heretofore bags for use when picking fruit and used in connection with sowing grain, stiffening members of various types have been used at the entrance mouth of the bag, and in some instances some of these stiffening members have minimum resiliency, as so stated in patent dated March 6, 1894, Patent Number 516,097, but such minimum resiliency as stated in said patent is more or less foiled, since stiffness and strength and reinforcement to the bag is more emphasized and does not carry with it any cushioning action against the body of the user. Most of the bags employ stiffening elements at the entrance mouth of the bag of a very narrow character, with practically no resiliency whatever, and such stiffening members are very uncomfortable to the body of the user, due to the fact that they cut into the body at a point adjacent the stomach and below the ribs, which has been found to be very hurtful to the body.

It is therefore, the purpose of the present invention to provide an extremely pliable insert of substantial depth, at the entrance mouth of the bag, such as will cushion against the body of the user without hurt to the body or leaving any soreness, being comfortable at all times, due to the fact that such broad loosely pliable insert will accommodate itself to the movements of the body.

Another purpose is to provide such a freely pliable insert of extreme depth at the entrance mouth of the bag so as to not only hold the entrance mouth fully open at all times, but will allow the open entrance mouth to pass by branches of the tree when picking apples or similar fruit, and very easily and quickly resume the normal distended open position.

In fact, a further purpose is to provide an extremely pliable insert of substantial depth, that it is even possible to practically flatten the entrance mouth of the bag by contacting with branches of the tree, due to the picker leaning over a branch, and yet the insert will instantly restore the entrance mouth of the bag to a normal distended open position.

Also heretofore it is common expedience to construct bags of this kind, which are open at their lower ends, to fruit being retained in the bag, by folding the bag over at a point near its lower end, it also being common to fasten the folded open end, either direct to the body of the bag or connected indirectly by a rope, necessitating the fruit picker to lean over in order to reconnect the lower open end of the bag, after permitting the fruit to discharge from the bag.

Hence, it is a further purpose of this invention to provide a requisite length of rope loop which can be temporarily placed around the neck of the fruit picker, to hold the lower open end of the bag folded, for the retention of the fruit in the bag. In this way the fruit picker is merely required to remove the rope loop from around the neck and allow the bag to unfold, the fruit automatically discharging, then the picker can replace the loop about the neck, thereby avoiding leaning over to fold the lower open end of the bag.

A further purpose is to provide, in a fruit picker's bag an adjustable shoulder strap, which can be placed over either shoulder of the picker, allowing the bag to be worn on the body of the picker at either side.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figure 1 is a perspective view of the improved fruit picker's bag constructed in accordance with the invention, showing the lower end of the bag folded, the rope loop and the shoulder strap in positions which they may assume while the bag is in use.

Figure 2 is a central vertical sectional view of the structure of Figure 1, but showing in dotted lines the lower end of the bag unfolded and open.

Figure 3 is a sectional view on the plane indicated by the line 3—3 of Figure 1.

Figure 4 is an enlarged vertical sectional view through a wall of the entrance mouth.

Referring to the drawing 1 identifies the bag as a whole, and which may be made of any suitable durable fabric, such as duck or canvas or similar material, and which may have any desired shape and be of any suitable proportions, so long as the bag has an entrance mouth 2 and a lower discharge open end 3.

The entrance mouth 2 is of a size preferably short of one side of the bag. An insert cushion 4 is provided interiorly of the entrance mouth. This insert cushion may be of any size, that is to say in circumference, but preferably of considerable depth, so that when the bag lies against the body of the fruit picker it can do so with great comfort and ease to the user, and without any hurt or causing any soreness to the body. The insert cushion comprises a fabric cover 5 having on its interior any suitable extremely pliable cushioning element 6 of substantial depth. Preferably this cushioning element, in the present instance consists of a plurality of thicknesses of wire fabric 7, such as screening material. It has been found that such material when confined in a cover acts to hold the entrance mouth distended in a full open position at all times, though it is possible for the fruit picker to pass between closely arranged branches, or to lean over a branch, even depress the distended entrance mouth practically flat, resulting in the entrance mouth instantly resuming its normal open distended position. The entrance mouth has a substantially straight portion as at 8, which conforms to the curvature of the body of the user in a comfortable position without hurt or soreness to the body.

The cover of the insert cushion is stitched at 9 to the margin of the entrance mouth, and can be easily removed at any time for repairs if the need requires.

Attached at 10 to one side of the bag, adjacent the margin of the entrance mouth, is a shoulder strap 11, which may be made of any suitable fabric material preferably jute or cotton webbing, and this shoulder strap has its other end passing through a metal loop 12, the extremity of the strap being connected to a buckle 13 adjustable on the body of the strap, enabling the bag to be held at various heights, with the strap passing over either shoulder of the user. The metal loop 12 is connected to a fabric loop 14 fastened in any suitable manner at 15 to a side extension of the bag. This side extension 16 is provided for the purpose of constructing the bag in order to have a wide interior at a point below the entrance mouth of the bag, which permits apples and similar fruit to be more easily retained in the bag.

Connected at 17 to one side of the bag is a strap 18 constructed of any suitable fabric preferably jute or cotton webbing, and its other end may be connected adjustably to the other side of the bag by means of a buckle 19. Connected to the lower open end of the bag is a rope loop 20, which is of a size sufficient to allow it to engage about the neck of the user and hold the lower open end of the bag folded for the purpose of retaining the fruit, such as apples and the like within the bag. Obviously when it is desired to discharge the fruit the rope loop can be detached from around the neck, in which case the user retains hold on the rope loop and allows the open end of the bag to unfold and the fruit to discharge. Subsequently the user simply replaces the rope loop in engagement with the neck.

The invention having been set forth, what is claimed is:

1. In a fruit picker's bag, a bag body provided at its upper end with a filling opening and at its lower end with a discharge opening, means for suspending the bag on a fruit picker's body, and a cushioning insert element of a plurality of thicknesses of wire fabric imbedded in and carried by and conforming to the entire margin of the filling opening, said element being of substantial depth, the outer portion of the insert element being substantially cushiony and substantially pliable from one side of the bag to the other, whereby when the outer portion of the filling opening flatly collapses, it will automatically resume its normal distended open shape, and means for releasably retaining the lower end of the bag folded closed.

2. A fruit picker's bag open at its upper end, means for supporting the bag on the fruit picker's person, and a cushioning insert constituting a spreader for the open end of the bag and comprising a metal fabric imbedded in and coterminous marginally with the open end, said insert being of substantial width of a high degree of flexibility and highly resilient throughout its entire extent, so that the insert will readily yield from lateral pressure of the picker's body against an obstruction and will immediately assume its normal contour when such pressure is removed.

CHARLES H. KAVANAGH.